(12) United States Patent
Nishida et al.

(10) Patent No.: US 10,927,752 B2
(45) Date of Patent: Feb. 23, 2021

(54) BLOW-BY GAS DEVICE OF SUPERCHARGER-EQUIPPED ENGINE

(71) Applicant: Mazda Motor Corporation, Hiroshima (JP)

(72) Inventors: Ryotaro Nishida, Hiroshima (JP); Tsuyoshi Goto, Hiroshima (JP); Mitsutaka Yamaya, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 37 days.

(21) Appl. No.: 16/423,919

(22) Filed: May 28, 2019

(65) Prior Publication Data

US 2019/0368411 A1 Dec. 5, 2019

(30) Foreign Application Priority Data

Jun. 4, 2018 (JP) .............................. JP2018-106858
Jan. 21, 2019 (JP) .............................. JP2019-007967

(51) Int. Cl.

| F02B 29/02 | (2006.01) |
|---|---|
| F01M 3/02 | (2006.01) |
| F01M 13/00 | (2006.01) |
| F02B 29/04 | (2006.01) |
| F01M 13/02 | (2006.01) |

(52) U.S. Cl.
CPC .............. F02B 29/02 (2013.01); F01M 3/02 (2013.01); F01M 13/00 (2013.01); F02B 29/0418 (2013.01); *F01M 2013/027* (2013.01)

(58) Field of Classification Search
CPC ...... F02B 29/02; F02B 33/36; F02B 29/0418; F02B 33/32; F01M 3/02; F01M 13/00; F01M 2013/027; F01M 11/02; F01M 2011/021; F01M 9/108; F01M 13/023; F01M 13/0405; F01M 2013/0044; F16N 2210/14; F16C 33/1005; F16C 33/6662

See application file for complete search history.

(56) References Cited

U.S. PATENT DOCUMENTS 4,599,862 A * 7/1986 Bergeron ................ F01D 25/18
60/605.3

FOREIGN PATENT DOCUMENTS

| EP | 1788206 A2 * | 5/2007 | ............ F01M 13/04 |
|---|---|---|---|
| EP | 1788206 A2 | 5/2007 | |
| GB | 598131 A * | 2/1948 | ............ F02B 33/00 |
| GB | 598131 A | 2/1948 | |
| JP | H04203213 A | 7/1992 | |
| JP | 06108818 A * | 4/1994 | |
| JP | H06108818 A | 4/1994 | |
| JP | 3470419 B2 | 11/2003 | |
| JP | 2007309257 A | 11/2007 | |
| JP | 2012036829 A | 2/2012 | |

* cited by examiner

*Primary Examiner* — Audrey K Bradley
*Assistant Examiner* — Edward Bushard
(74) *Attorney, Agent, or Firm* — Alleman Hall Creasman & Tuttle LLP

(57) ABSTRACT

A blow-by gas device of a supercharger-equipped engine includes a blow-by gas passage that introduces blow-by gas into an intake passage via a positive crankcase ventilation (PCV) valve. A supercharger has a supercharger rotor provided integrally with a rotation shaft rotatably supported on a bearing part. A space communicating with the bearing part is connected to a communication passage. The communication passage guides the blow-by gas into the space.

8 Claims, 11 Drawing Sheets

BLOW-BY GAS DEVICE OF SUPERCHARGER-EQUIPPED ENGINE

CROSS-REFERENCE TO RELATED APPLICATION

This application claims priority to Japanese Patent Application No. 2018-106858 filed on Jun. 4, 2018 and Japanese Patent Application No. 2019-007967 filed on Jan. 21, 2019, the entire disclosures of each of which are incorporated by reference herein.

BACKGROUND

The present disclosure relates to a blow-by gas device of a supercharger-equipped engine.

Japanese Unexamined Patent Publication No. H04-203213 discloses an intake device of a supercharger-equipped engine. This patent document describes a configuration in which a blow-by gas introduction part is connected to a branch part of a supercharger bypass passage.

In general, a supercharger includes a pair of supercharger rotors inside a supercharger body. These supercharger rotors are rotatably supported via a plurality of bearing parts including bearings.

SUMMARY

Although not disclosed in Japanese Unexamined Patent Publication No. H04-203213, there are cases where exhaust gas recirculation (EGR) gas is introduced into an intake passage provided upstream of the supercharger. The EGR gas contains dust such as soot and/or condensed water. The dust and the like may have an adverse influence on bearing parts of the supercharger and sealing members disposed adjacent to the bearing parts.

It is therefore important to ensure the lubrication and the sealability of each bearing part and each sealing member.

The present disclosure attempts to reduce the entry of dust and the like into bearing parts of a supercharger while improving the lubrication of the bearing parts and sealing members of the supercharger.

The present disclosure relates to a blow-by gas device of a supercharger-equipped engine in which a supercharger is provided at a location downstream of a throttle valve in an intake passage.

The blow-by gas device includes: a positive crankcase ventilation (PCV) valve; and a blow-by gas passage connected to a portion of the intake passage located between the throttle valve and the supercharger and to an engine body, the blow-by gas passage introducing blow-by gas discharged from the engine body into the intake passage via the PCV valve. The PCV valve is a well-known valve that changes the flow rate of the blow-by gas.

The supercharger includes a supercharger body including therein a rotor chamber, a rotation shaft rotatably supported on at least one bearing part communicating with the rotor chamber, the rotation shaft rotated by power of a driving source, and a supercharger rotor provided integrally with the rotation shaft and rotatably disposed inside the rotor chamber. The supercharger body includes a space communicating with the bearing part. The space is connected to a communication passage branching off from a portion downstream of the PCV valve in the blow-by gas passage.

DETAILED DESCRIPTION

Figure 1:
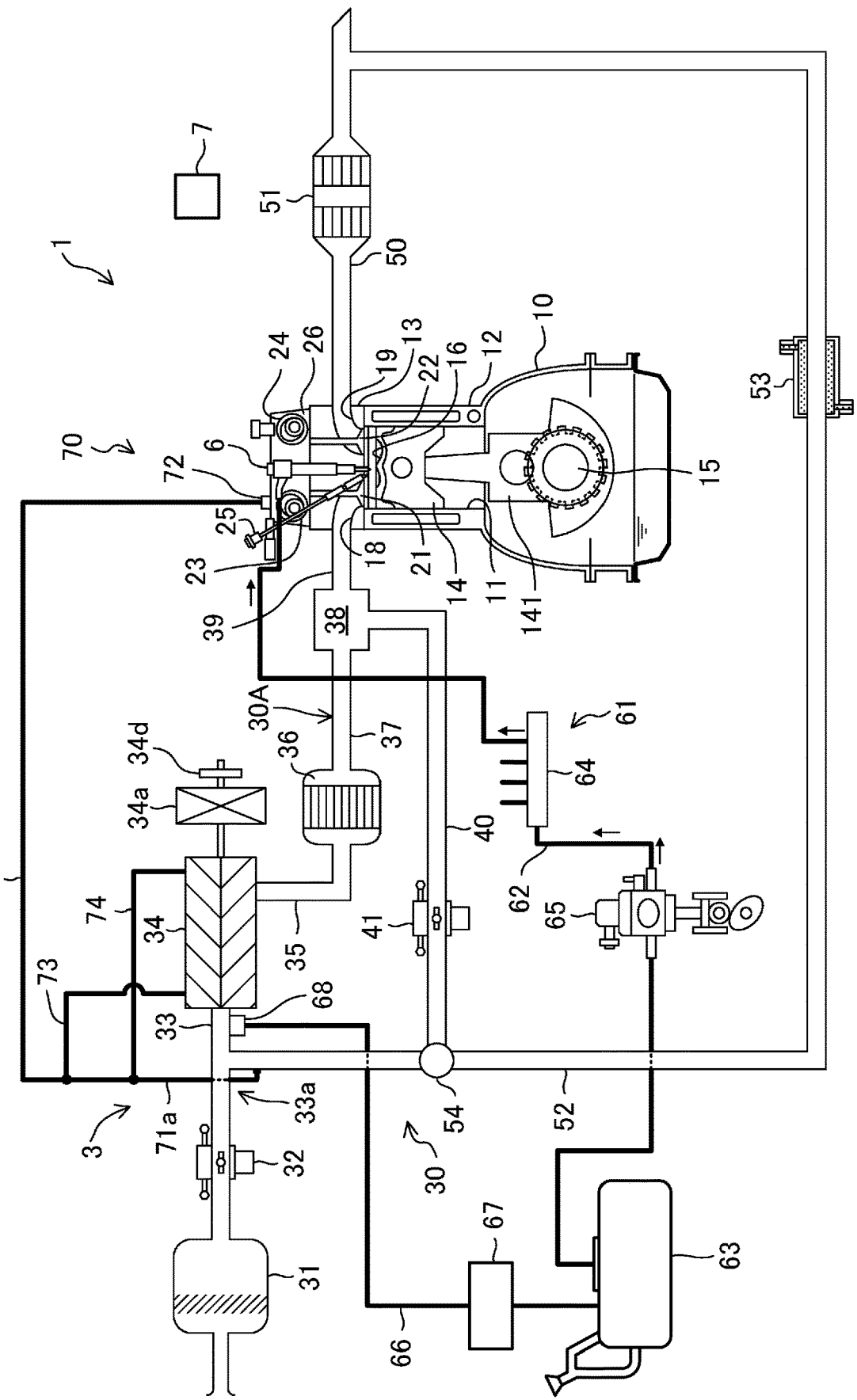
FIG. 1 illustrates a configuration of an engine.

A blow-by gas device of the present disclosure includes: a positive crankcase ventilation (PCV) valve; and a blow-by gas passage connected to a portion of an intake passage located between a throttle valve and a supercharger and to an engine body, the blow-by gas passage introducing blow-by gas discharged from the engine body into the intake passage via the PCV valve.

The supercharger includes a supercharger body including therein a rotor chamber, a rotation shaft rotatably supported on at least one bearing part communicating with the rotor chamber, the rotation shaft being rotatable by power of a driving source, and a supercharger rotor provided integrally with the rotation shaft and rotatably disposed inside the rotor chamber. The supercharger body includes a space communicating with the bearing part. The space is connected to a communication passage. The communication passage guides the blow-by gas discharged from the engine body into the space.

According to the blow-by gas device, the communication passage is connected to the space of the supercharger. The bearing part communicates with the rotor chamber, and the space communicates with the bearing part. The communication passage guides the blow-by gas discharged from the engine body into the space.

When the supercharger is not performing supercharging, the rotor chamber is not pressurized. Accordingly, the internal pressure of the space also decreases. Consequently, the blow-by gas is introduced into the space through the communication passage. The term "blow-by gas" refers to gas that leaks from a combustion chamber of an engine. Thus, the blow-by gas contains oil mist. The oil mist contained in the blow-by gas improves the lubrication of the bearing part.

On the other hand, when the supercharger is performing supercharging, the rotor chamber is pressurized. Therefore, the internal pressure of the space increases. When the internal pressure of the space increases, even though dust and the like enter the bearing part and the space, the dust and the like are sucked out to the communication passage. Consequently, the entry of dust and the like into the bearing part can be reduced.

The communication passage may branch off from a portion downstream of the PCV valve in the blow-by gas passage.

With this configuration, when the supercharger is not performing supercharging, the blow-by gas is introduced into the space through the blow-by gas passage and the communication passage. When the supercharger is performing supercharging, the dust and the like are sucked out to the blow-by gas passage through the communication passage.

The supercharger body may include a sealing member disposed between the bearing part and the rotor chamber, and the space may be an annular space adjacent to the sealing member and formed around the rotation shaft.

With this configuration, the oil mist contained in the blow-by gas is supplied to the space comprised of the annular space. As a result, the lubrication of the sealing member and the bearing part is improved. Sealability is also improved. When the internal pressure of the space increases, dust and the like that have entered the bearing part and the space are sucked out to the communication passage. This feature makes it possible to reduce the entry of dust and the like into the bearing part of the supercharger.

The bearing part may be located on an intake side of the supercharger, and the space may be defined by the sealing member and an annular stepped portion provided at the supercharger body.

This configuration makes it possible to improve the lubrication and the like of the bearing part and the sealing member located on the intake side.

The bearing part may be located on a discharge side of the supercharger, and the space may be defined between the sealing member and a sealing member facing the sealing member.

This configuration makes it possible to improve the lubrication and the like of the bearing part and the sealing member located on the discharge side and to reduce the entry of dust and the like.

Furthermore, the communication passage may communicate with a portion upstream of the PCV valve in the blow-by gas passage or the engine body.

The internal pressure of a portion upstream of the PCV valve in the blow-by gas passage and the internal pressure of the engine body are higher than that of a portion downstream of the PCV valve in the blow-by gas passage. Accordingly, when the communication passage communicates with the portion upstream of the PCV valve or the engine body, a pressure difference between an upstream portion of the communication passage and the space becomes larger as compared with a case where the communication passage branched off from a portion downstream of the PCV valve. As a result, the blow-by gas is stably introduced into the space, thereby further improving the lubrication and the like of the bearing part and the sealing member.

In such a case, it is preferable that the blow-by gas is discharged through an oil separator chamber provided in the engine body, and the communication passage includes a flow rate reducer which communicates with the oil separator chamber and reduces an amount of the blow-by gas flowing into the space.

In the oil separator chamber, blow-by gas containing oil mist is generated due to gas-liquid separation. Accordingly, when the space and the oil separator chamber are connected to each other, oil is efficiently supplied to the space. The lubrication and the like of the bearing part and the sealing member are further improved.

When the space and the oil separator chamber are connected to each other, a large amount of blow-by gas is introduced into the space. If the blow-by gas is excessively introduced into the space, the amount of intake air may fluctuate by blow-by gas entering the rotor chamber. Such fluctuations in the amount of intake air may result in a decrease in the output of the engine. The flow rate reducer, which reduces the amount of the blow-by gas flowing into the space, can make such a problem less likely to occur.

The communication passage may include an anti-backflow part that reduces the backflow of the blow-by gas to the oil separator chamber. For example, a check value can be employed as the anti-backflow part.

Reduction of the backflow of the blow-by gas is suppressed enables the blow-by gas to be more stably introduced into the space. The check value is capable of preventing the backflow of the blow-by gas.

The two types of communication passages described above may be combined with each other.

For example, the supercharger body may include an intake-side space communicating with the bearing part on the intake side, and a discharge-side space communicating with the bearing part on the discharge side. The intake-side space may be connected to a first communication passage communicating with a portion upstream of the PCV valve in the blow-by gas passage or with the engine body. The discharge-side space may be connected to a second communication passage branching off from a portion downstream of the PCV valve in the blow-by gas passage.

With this configuration, the first communication passage is relatively higher in pressure than the second communication passage. Consequently, the blow-by gas is more stably introduced into the intake-side space than the discharge-side space. This feature makes it possible to stably improve the lubrication and the like of the bearing part on the intake side.

With respect to the bearing part on the discharge side, the lubrication and the like can be improved with the help of pressure balance attained when supercharging is not performed. In addition, the entry of dust and the like into the bearing part on the discharge side can be reduced by the suction effect.

A configuration example of the present disclosure will be described below in detail with reference to the drawings. The following description is merely an example and is not intended to limit the application or uses of the present disclosure.

FIG. 1 illustrates a general configuration of an engine 1 equipped with a supercharger 34. The engine 1 includes a blow-by gas device according to the present disclosure.

Figure 2:
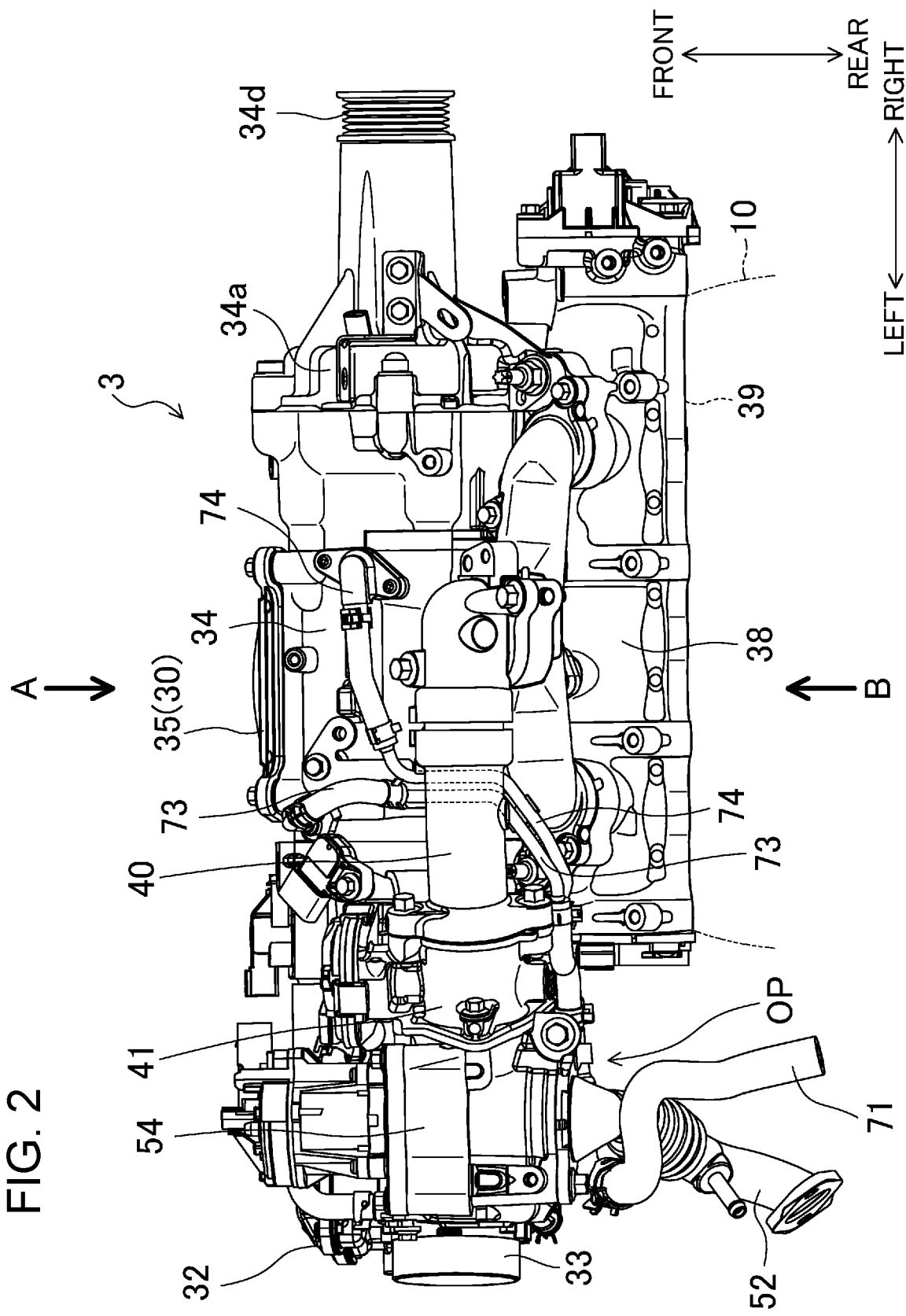
FIG. 2 is a top view of an intake unit.
Figure 3:
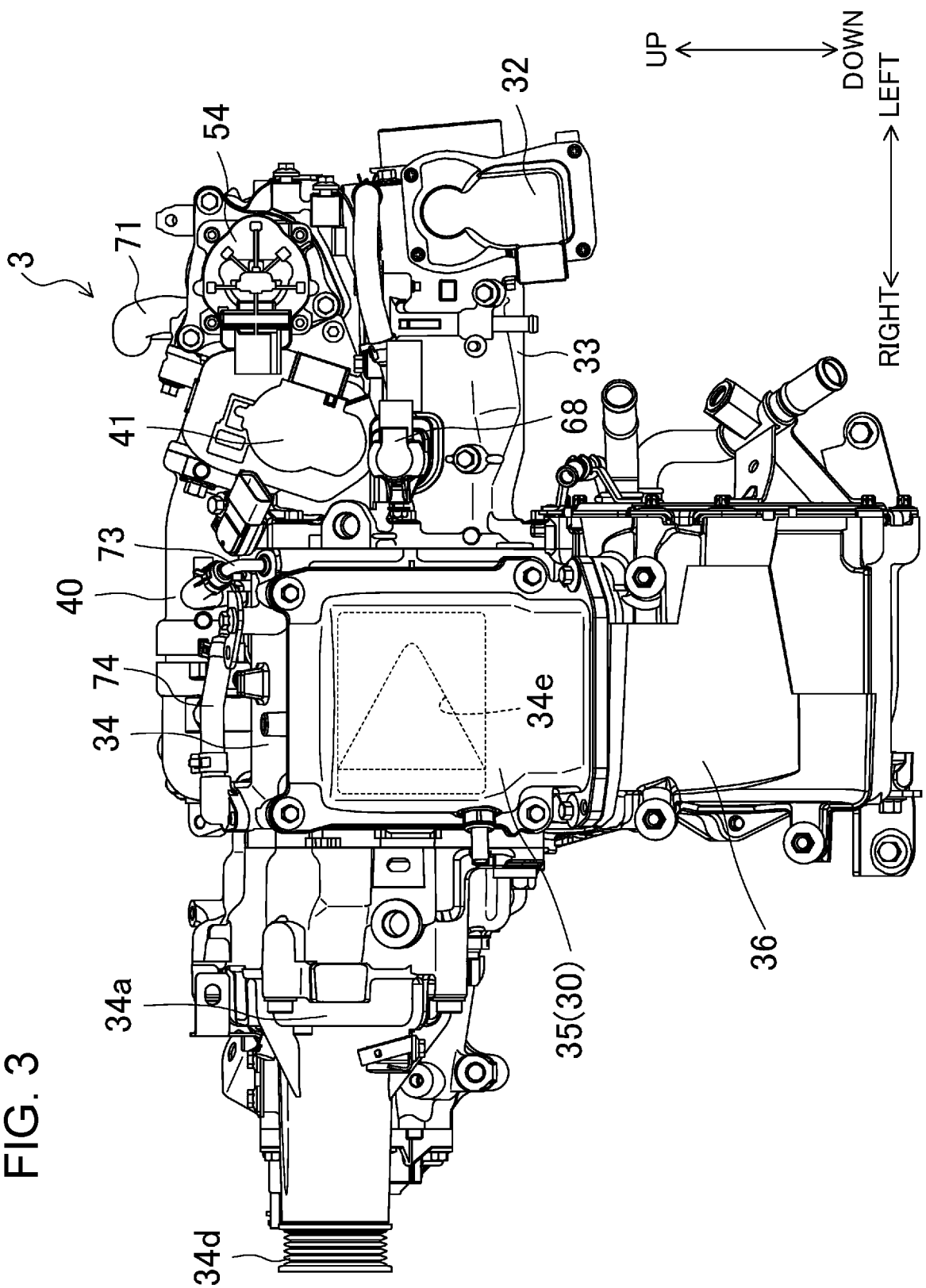
FIG. 3 is a front view of the intake unit, as viewed along an arrow A in FIG. 2.
Figure 4:
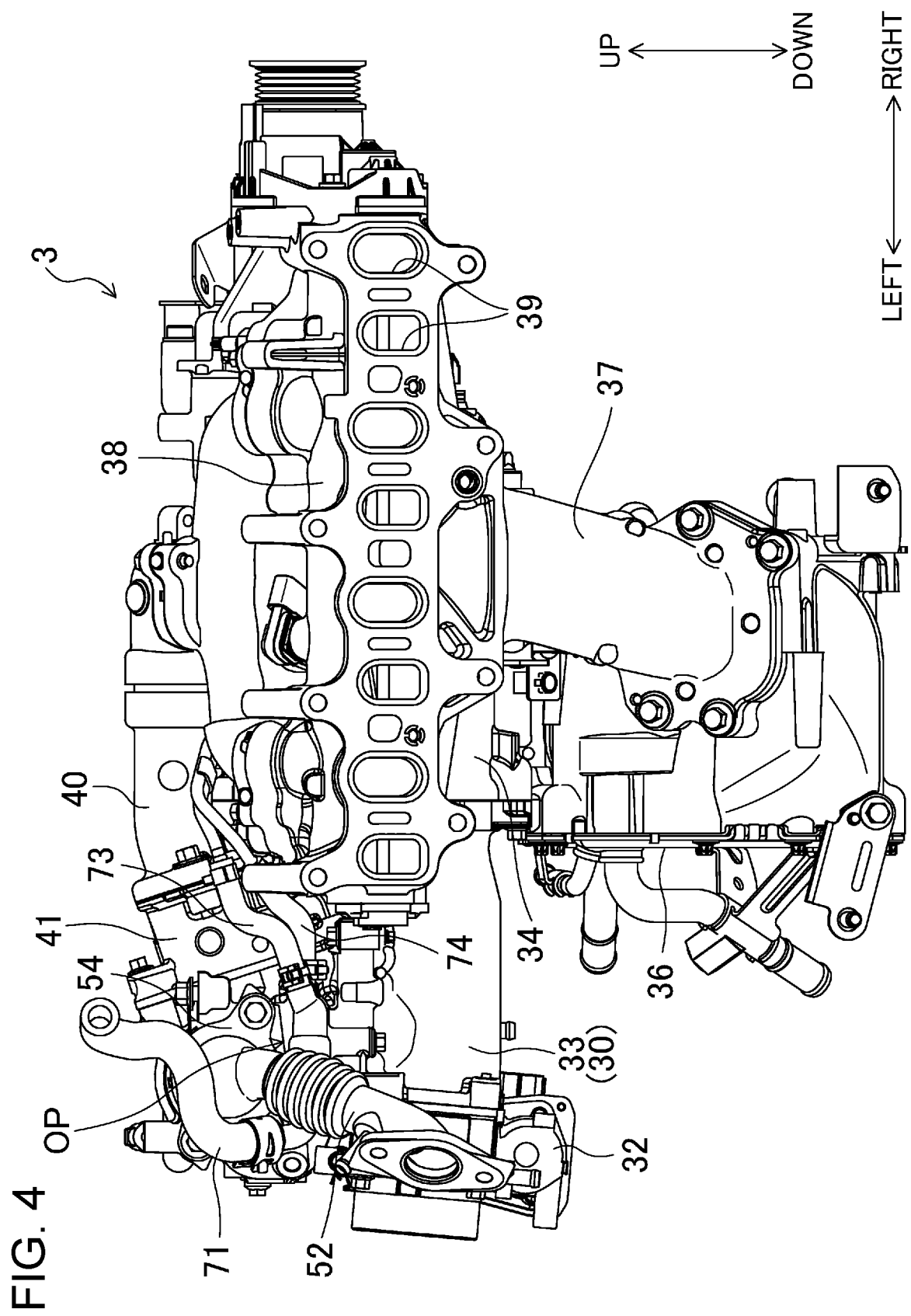
FIG. 4 is a rear view of the intake unit, as viewed along an arrow B in FIG. 2.

FIGS. 2 to 4 specifically illustrate a structure of an intake unit 3 included in the engine 1. FIG. 2 illustrates the intake unit 3 as viewed from above. FIG. 3 illustrates the intake unit 3 as viewed along the arrow A in FIG. 2 (i.e., as viewed from the front). FIG. 4 illustrates the intake unit 3 as viewed along the arrow B in FIG. 2 (i.e., as viewed from the rear).

For example, the engine 1 is a four-stroke internal combustion engine to be mounted on a vehicle. The engine 1 includes the supercharger 34. The fuel of the engine 1 is not particularly limited. In this configuration example, the fuel of the engine 1 is gasoline.

Furthermore, the engine 1 includes four cylinders 11 arranged in a row although not specifically illustrated. The engine 1 is a so-called in-line four-cylinder transverse engine 1. The engine 1 is mounted on a vehicle such that the four cylinders 11 are juxtaposed along a vehicle width direction.

As a result, the right-to-left direction of the engine 1, which is the arrangement direction (a cylinder row direction) of the four cylinders 11, approximately coincides with the vehicle width direction.

The directions of up, down, left, right, front, and rear are indicated in each drawing. Unless otherwise stated, the "front" refers to the front side of the vehicle. The "rear" refers to the rear side of the vehicle. The "left" refers to one side in the vehicle width direction. The "right" refers to the other side in the vehicle width direction. Furthermore, "up" refers to an upper side of the engine 1 mounted on the vehicle, and "down" refers to a lower side thereof.

(General Configuration of Engine)

The engine 1 includes an engine body 10 having the four cylinders 11, an intake passage 30, and an exhaust passage 50. The intake passage 30 is disposed on the front side of the engine body 10 and communicates with each cylinder 11 via an intake port 18. The exhaust passage 50 is disposed on the rear side of the engine body 10 and communicates with each cylinder 11 via an exhaust port 19.

The intake passage 30 forms part of the intake unit 3. The intake unit 3 includes the intake passage 30, and devices such as an air cleaner 31, a throttle valve 32, the supercharger 34, an intercooler 36, and a surge tank 38, all of which are all combined together and integrally. The engine body 10 causes an air-fuel mixture containing fuel and intake air supplied through the intake unit 3 to burn in a combustion chamber 16 formed in each cylinder 11. The engine body 10 then exhausts exhaust gas generated by the combustion through the exhaust passage 50.

The engine body 10 has a cylinder block 12 and a cylinder head 13 placed on the cylinder block 12. Inside the cylinder block 12, the four cylinders 11 are formed. These cylinders 11 are juxtaposed along a direction in which a crankshaft 15 extends. Note that FIG. 1 illustrates only one cylinder.

Inside each cylinder 11, a piston 14 is inserted so as to freely slide. Each piston 14 is connected to the crankshaft 15 via a connecting rod 141. The piston 14, the cylinder 11, and the cylinder head 13 together define the combustion chamber 16. The "combustion chamber" as used herein is not limited only to a space formed when the piston 14 reaches a compression top dead center. The term "combustion chamber" is used in a broad sense.

The cylinder head 13 has, for example, two intake ports 18 formed therein with respect to one cylinder 11. Note that FIG. 1 illustrates only one intake port 18. The two intake ports 18 communicate with the cylinder 11. The two intake ports 18 are adjacent to each other in the cylinder row direction.

Each of the two intake ports 18 is provided with an intake valve 21. Each intake valve 21 is opened and closed between the combustion chamber 16 and the associated intake port 18. The intake valve 21 is opened and closed by an intake valve mechanism 23 at a predetermined timing.

The intake valve mechanism 23 has a variable valve mechanism although not specifically illustrated. The variable valve mechanism is configured to continuously vary a rotational phase of an intake camshaft within a predetermined angle range. In this way, the opening timing and closing timing of each intake valve 21 continuously changes.

Furthermore, the cylinder head 13 has, for example, two exhaust ports 19 formed therein with respect to one cylinder 11. Note that FIG. 1 illustrates only one exhaust port 19. The two exhaust ports 19 communicate with the cylinder 11. The two exhaust ports 19 are adjacent to each other in the cylinder row direction.

Each of the two exhaust ports 19 is provided with an exhaust valve 22. Each exhaust valve 22 is opened and closed between the combustion chamber 16 and the associated exhaust port 19. The exhaust valve 22 is opened and closed by an exhaust valve mechanism 24 at a predetermined timing.

The exhaust valve mechanism 24 has a variable valve mechanism although not specifically illustrated. The variable valve mechanism is configured to continuously vary a rotational phase of an exhaust camshaft within a predetermined angle range. In this way, the opening timing and closing timing of each exhaust valve 22 continuously changes.

In the cylinder head 13, an injector 6 is attached to each cylinder 11. Each injector 6 is, for example, a multi-nozzle port type fuel injection valve. The injector 6 directly injects fuel into each combustion chamber 16.

A fuel supply system 61 is connected to the injectors 6. The fuel supply system 61 includes a fuel tank 63 and a fuel supply passage 62. The fuel tank 63 stores fuel. The fuel supply passage 62 connects the fuel tank 63 to the injectors 6. A fuel pump 65 and a common rail 64 are interposed in the fuel supply passage 62.

Furthermore, in the cylinder head 13, an ignition plug 25 is attached to each cylinder 11. A distal end of the ignition plug 25 faces the inside of the combustion chamber 16. The ignition plug 25 forcibly ignites the air-fuel mixture in the combustion chamber 16.

(Configuration of Intake Unit)

The air cleaner 31 is disposed at an upstream end of the intake passage 30. The surge tank 38 is a container-like device that temporarily stores intake air. The surge tank 38 is disposed at a downstream end of the intake passage 30. The throttle valve 32 is disposed at a location downstream of the air cleaner 31 in the intake passage 30. An opening degree of the throttle valve 32 is changed in accordance with an operation state of the engine 1. A change in the opening degree of the throttle valve 32 causes a change in an amount of air to be introduced into the combustion chamber 16.

The supercharger 34 is disposed at a location downstream of the throttle valve 32 in the intake passage 30. The supercharger 34 supercharges intake air to be introduced into each combustion chamber 16. The supercharger 34 is driven by the engine 1. Specifically, the supercharger 34 is driven by power transmitted via the crankshaft 15. The supercharger 34 is configured, for example, as a twin-shaft rotary Roots blower.

Between the supercharger 34 and the crankshaft 15, an electromagnetic clutch 34a and a driving pulley 34d are interposed. An annular timing belt is wrapped around the driving pulley 34d and the crankshaft 15. Thus, the driving pulley 34d and the crankshaft 15 rotate in conjunction with each other.

The electromagnetic clutch 34a connects the supercharger 34 to the crankshaft 15 so as to transmit driving force or blocks the transmission of the driving force. An engine control unit (ECU) 7 switches the electromagnetic clutch 34a between blocking and connecting. When the electromagnetic clutch 34a blocks the driving power, the supercharger 34 enters an off state. When the electromagnetic clutch 34a connects the supercharger 34 to the crankshaft 15, the supercharger 34 enters an on state.

The switching of the supercharger 34 between the on state and off state enables the engine 1 to switch between a supercharging operation in which intake air to be introduced into the combustion chambers 16 is supercharged and a natural intake operation in which the intake air to be introduced into the combustion chamber 16 is not supercharged. Details of the structure of the supercharger 34 will be described later. The supercharger 34 may be an electric supercharger that is driven by electric power.

The intercooler 36 is disposed at a location downstream of the supercharger 34 in the intake passage 30. The intercooler 36 cools the intake air compressed by the supercharger 34. The intercooler 36 is, for example, a water-cooled intercooler.

The intake passage 30 has a first passage 33, a second passage 35, a third passage 37, and independent passages 39. The first passage 33 constitutes a portion of the intake passage 30, the portion located downstream of the throttle valve 32 and upstream of the supercharger 34. The second passage 35 constitutes a portion of the intake passage 30, the portion located downstream of the supercharger 34 and upstream of the intercooler 36. The third passage 37 constitutes a portion of the intake passage 30, the portion located downstream of the intercooler 36 and upstream of the surge tank 38. The independent passages 39 constitute a portion of the intake passage 30, the portion located downstream of the surge tank 38 and upstream of each intake port 18.

The independent passages 39 branch off from the surge tank 38 so that each of the independent passages 39 corresponds to an associated one of the intake ports 18. The first passage 33, the second passage 35, the third passage 37, and the independent passages 39 together constitute a main intake passage 30A that is a main portion of the intake passage 30.

The intake passage 30 is provided with a bypass passage 40 that bypasses the supercharger 34 and the intercooler 36, separately from the main intake passage 30A. Specifically, the bypass passage 40 branches off from an upstream-side branch part 33a in an intermediate portion of the first passage 33, and is connected to the surge tank 38 that is a downstream-side branch part.

In the bypass passage 40, a bypass valve 41 is disposed which changes a flow passage sectional area of the bypass passage 40. The bypass valve 41 changes the sectional area of the bypass passage 40 in accordance with the operation state of the engine 1. In this manner, the flow rate of intake air flowing through the bypass passage 40 is adjusted.

An evaporated fuel passage 66 is connected to the intake passage 30. The evaporated fuel passage 66 introduces fuel vapor generated in the fuel tank 63 into the intake passage 30. The evaporated fuel passage 66 extends from an upper part of the fuel tank 63, and is connected to a purge valve 68 disposed in the first passage 33 via a canister 67. The canister 67 is a container for temporarily storing the fuel vapor.

(Configuration of Exhaust Passage)

The exhaust passage 50 is connected to a side opposite to the intake passage 30, i.e., to the rear side of the engine body 10. Although not illustrated, an upstream end of the exhaust passage 50 constitutes independent passages branching off and each corresponding to an associated one of the cylinders 11. These independent passages are connected to the exhaust ports 19 of each cylinder 11.

In the exhaust passage 50, an exhaust gas purification system is disposed which has at least one catalytic converter 51. The catalytic converter 51 includes a three-way catalyst. The exhaust gas purification system is not limited to a configuration including only the three-way catalyst.

An exhaust gas recirculation (EGR) passage 52 extends between the intake passage 30 and the exhaust passage 50 so as to connect these passages 50 and 30 together. The EGR passage 52 constitutes an external EGR system. The EGR passage 52 introduces part of exhaust gas into the intake passage 30. Specifically, an upstream end of the EGR passage 52 is connected to a portion downstream of the catalytic converter 51 in the exhaust passage 50 and communicates with the exhaust passage 50.

On the other hand, a downstream end of the EGR passage 52 communicates with a portion of the intake passage 30, the portion located upstream of the supercharger 34 and downstream of the throttle valve 32. Details of this configuration will be described later.

In the EGR passage 52, an EGR cooler 53 and an EGR valve 54 are disposed. The EGR cooler 53 cools EGR gas. The EGR valve 54 adjusts the flow rate of the EGR gas flowing through the EGR passage 52. An electronic control unit (ECU) 7 adjusts an opening degree of the EGR valve 54, so that the amount of cooled external EGR gas to be introduced into the intake passage 30 is adjusted.

(Configuration of Blow-by Gas Return System)

The engine 1 is provided with a blow-by gas return system 70. The blow-by gas return system 70 constitutes the blow-by gas device according to the present disclosure. The blow-by gas return system 70 introduces blow-by gas, which leaks from the combustion chambers 16, into the intake passage 30, thereby returning the blow-by gas to the combustion chambers 16. The blow-by gas return system 70 includes a blow-by gas passage 71 and a PCV valve 72.

As illustrated in FIG. 1, a cylinder head cover 26 is provided on an upper portion of the cylinder head 13. The PCV valve 72 is provided on an upper portion of the cylinder head cover 26. The cylinder head cover 26 is provided therein with an oil separator chamber 27 (see FIG. 6).

The blow-by gas is introduced into the oil separator chamber 27. The blow-by gas contains engine oil. In the oil separator chamber 27, gas-liquid separation is performed, so that most of the oil contained in the blow-by gas is separated. The blow-by gas discharged through the oil separator chamber 27 contains oil mist.

The PCV valve 72 is connected to a passage communicating with the oil separator chamber 27. An upstream end of the blow-by gas passage 71 is connected to the PCV valve 72. The PCV valve 72 changes the flow rate of the blow-by gas flowing into the blow-by gas passage 71.

A downstream end of the blow-by gas passage 71 is connected to an upstream portion of the bypass passage 40. The blow-by gas passage 71 has a first communication passage 73 connected to a part on an intake side of the supercharger 34 and a second communication passage 74 connected to a part on a discharge side of the supercharger 34. Details of the blow-by gas passage 71 will be described later.

(Configuration of Supercharger)

Figure 5:
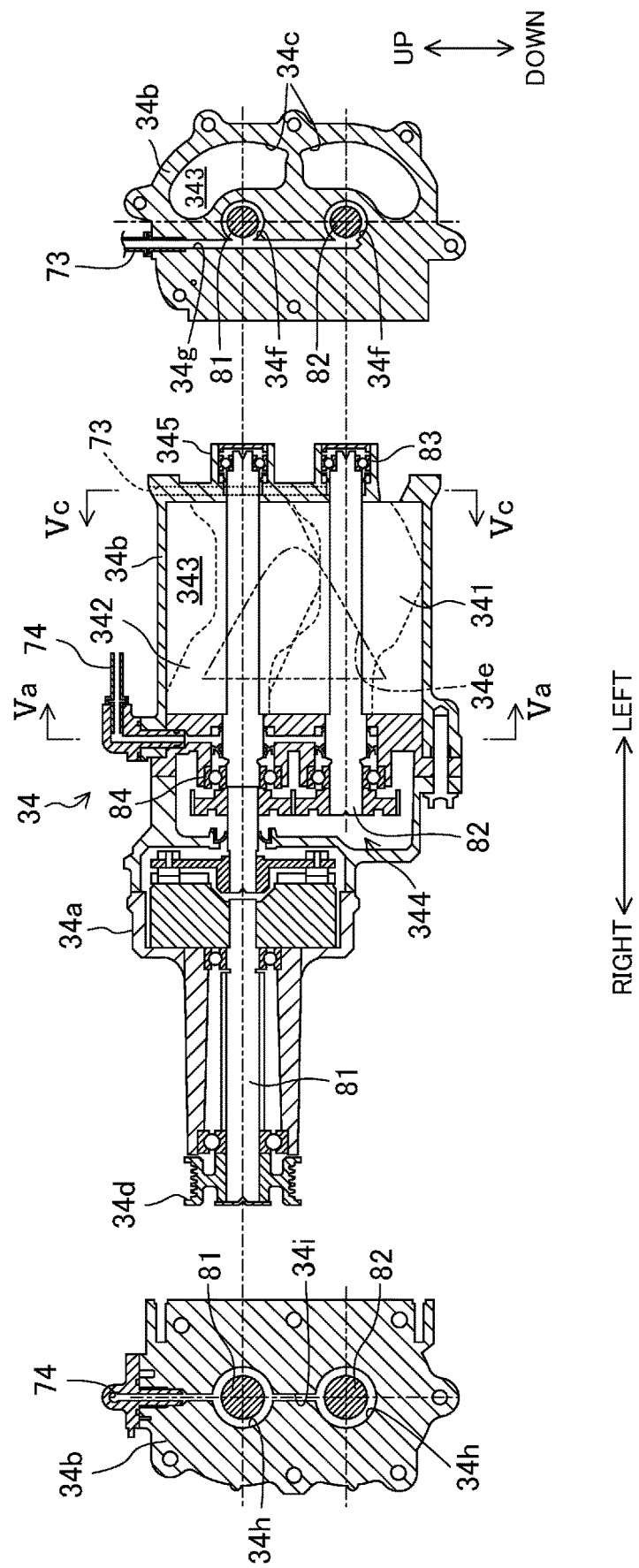
FIG. 5 illustrates cross sections of the supercharger, wherein a longitudinal cross section is shown at the center, a cross section taken along line Va-Va is shown on the left side, and a cross section taken along line Vc-Vc is shown on the right side.

As illustrated in FIG. 5, the supercharger 34 has a casing 34b (i.e., a supercharger body). The casing 34b includes therein a rotor chamber 343 and a gear chamber 344. Inside the rotor chamber 343 and the gear chamber 344, a pair of rotation shafts 81 and 82 including a driving rotation shaft and a driven rotation shaft is disposed to extend in parallel to the cylinder row direction.

The casing 34b is provided therein with a pair of bearing parts 83 and a pair of bearing parts 84 including bearing parts on an intake side and bearing parts on a discharge side. Each of the rotation shafts 81 and 82 is rotatably supported on a pair of the bearing part 83 and the bearing pairs 84.

Figure 6:
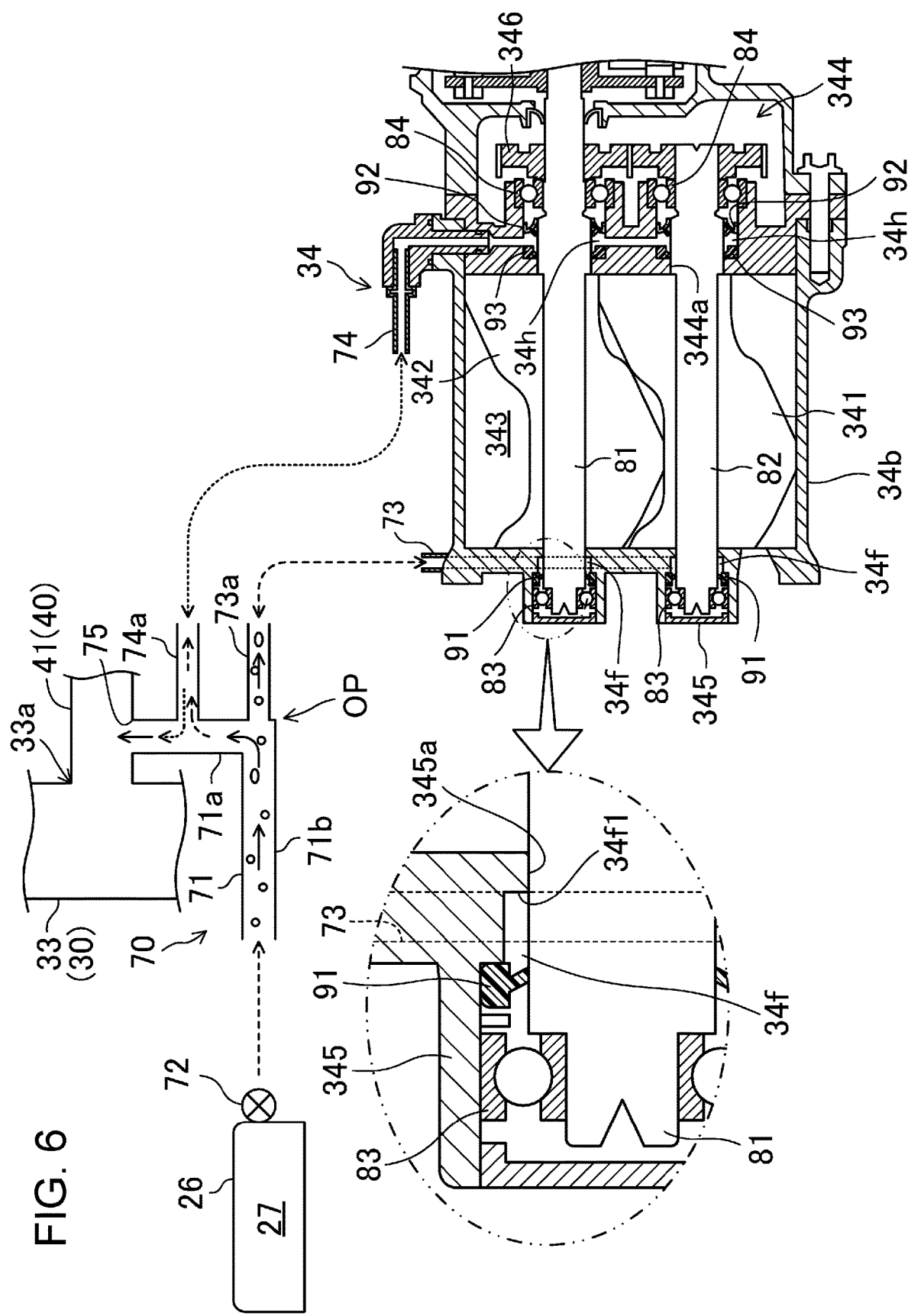
FIG. 6 schematically illustrates a connection configuration between the supercharger and a blow-by gas return system.

Also, as illustrated in FIG. 6, on the left side of the rotor chamber 343, small capacity bearing chambers 345 are provided to protrude from the casing 34b. The bearing chambers 345 form part of the casing 34b. The bearing chambers 345 receive ends of the rotation shafts 81 and 82. The bearing chambers 345 house ball bearings constituting the bearing parts 83 on the intake side.

The ends of the rotation shafts 81 and 82 protruding from the rotor chamber 343 into the bearing chambers 345 through shaft holes 345a are rotatably supported via the ball bearings. The bearing chambers 345 are provided with an intake-side sealing member 91. The intake-side sealing member 91 closes gaps between the shaft holes 345a and the rotation shafts 81 and 82.

The gear chamber 344 is disposed adjacent to the right side of the rotor chamber 343. Each of the rotation shafts 81 and 82 protrudes from the rotor chamber 343 into the gear chamber 344 through shaft holes 344a. The gear chamber 344 is also provided with sealing members that close gaps between the shaft holes 344a and the rotation shafts 81 and 82. Unlike the bearing chambers 345, the gear chamber 344 is provided with two sealing members 92 and 93. This will be described later.

The gear chamber 344 houses a gear train 346. The gear train 346 rotates the driving rotation shaft 81 and the driven rotation shaft 82 in conjunction with each other. The bearing parts 84 on the discharge side are housed in the gear chamber 344 together with the gear train 346. The gear chamber 344 is filled with an appropriate amount of oil for lubrication.

In the rotor chamber 343, a first rotor 341 and a second rotor 342 are housed to be adjacent to each other and to be partially engaged with each other. The first rotor 341 is integrally fixed to the driven rotation shaft 82. The second rotor 342 is integrally fixed to the driving rotation shaft 81. The driving rotation shaft 81 is longer than the driven rotation shaft 82. The driving shaft 81 protrudes from the gear chamber 344 and is coupled to the electromagnetic clutch 34a.

Reference is made to the cross-sectional view taken along line Vc-Vc, shown on the right side in FIG. 5. Intake ports 34c communicating with the rotor chamber 343 open at a left end of the casing 34b. On the other hand, a discharge port 34e opens at the front surface of the casing 34b. The discharge port 34e has a V shape or a triangular shape and exposes the rotor chamber 343.

The intake ports 34c communicate with the first passage 33. The discharge port 34e communicates with the second passage 35. When the first rotor 341 and the second rotor 342 are rotated, intake air flowing through the first passage 33 is sucked into the rotor chamber 343 through the intake ports 34c. The intake air sucked into the rotor chamber 343 is discharged through the discharge port 34e.

(Layout of Intake Unit)

As illustrated in FIG. 2, the intake unit 3 is disposed forward of the engine body 10. Specifically, the intake unit 3 is disposed along the front surfaces of the cylinder head 13 and the cylinder block 12. Particularly, the supercharger 34 and the intercooler 36 are disposed in a concentrated manner in the vicinity of the upstream ends of the intake ports 18 so as to increase a supercharging response.

The supercharger 34 is disposed forward of the horizontally-oriented surge tank 38 extending in the right-to-left direction. Between a rear portion of the supercharger 34 and a front portion of the engine body 10, a gap corresponding to the dimension of the surge tank 38 is provided. The first passage 33 extends on the left side of the supercharger 34 in the cylinder row direction. The first passage 33 is connected to the left end of the supercharger 34 in which the intake ports 34c open.

Furthermore, as illustrated in FIG. 3, the supercharger 34 and the intercooler 36 are arranged in the vertical direction in this order to be vertically adjacent to each other. The second passage 35 extends generally in the vertical direction to connect the front portion of the supercharger 34 where the discharge port 34e is provided to the front portion of the intercooler 36.

The surge tank 38 is disposed in a gap between the rear portion of the supercharger 34 and the plurality of independent passages 39 as illustrated in FIGS. 2 and 4. The third passage 37 extends below the supercharger 34. The intercooler 36 is located below the surge tank 38. The third passage 37 connects a rear portion of the intercooler 36 to a bottom portion of the surge tank 38.

The bypass passage 40 branches off from the upstream-side branch part 33a of the first passage 33, extends upward, and then extends rightward. The downstream end of the bypass passage 40 bifurcates into two branches which are connected to an upper portion of the surge tank 38 (see FIGS. 2 and 4).

(Use of Blow-by Gas for Supercharger)

The external EGR gas contains soot, dust such as oxides, water vapor, and the like. The water vapor and the like flow into the rotor chamber 343 of the supercharger 34 when the external EGR gas is introduced into intake air. The water vapor is cooled in the EGR cooler 53 to be condensed water in the EGR passage 52 and the bypass passage 40. The condensed water flows into the first passage 33 from the bypass passage 40, and accordingly, may flow into the rotor chamber 343 of the supercharger 34.

The entry of the dust and condensed water into the rotor chamber 343 of the supercharger 34 may deteriorate the bearing parts and the sealing members. To address this, the engine 1 of the present disclosure is suitably configured such that the blow-by gas return system 70 can suck intake air around the bearing parts and the sealing members or supply oil to the vicinity of the bearing parts and the sealing members in accordance with the operation state of the engine 1.

Specifically, as illustrated in FIG. 1, the first communication passage 73 and the second communication passage 74 are provided which branch off from a portion downstream of the PCV valve 72 in the blow-by gas passage 71. Furthermore, as illustrated in FIG. 6, the first communication passage 73 and the second communication passage 74 pass through the casing 34b of the supercharger 34 and reach the vicinity of the bearing parts 83 on the intake side and the vicinity of the bearing parts 84 on the discharge side, respectively. The first communication passage 73 communicates with spaces (intake-side annular spaces 34f) communicating with the bearing parts 83. The second communication passage 74 communicates with spaces (discharge-side annular spaces 34h) communicating with the bearing parts 84.

Figure 7:
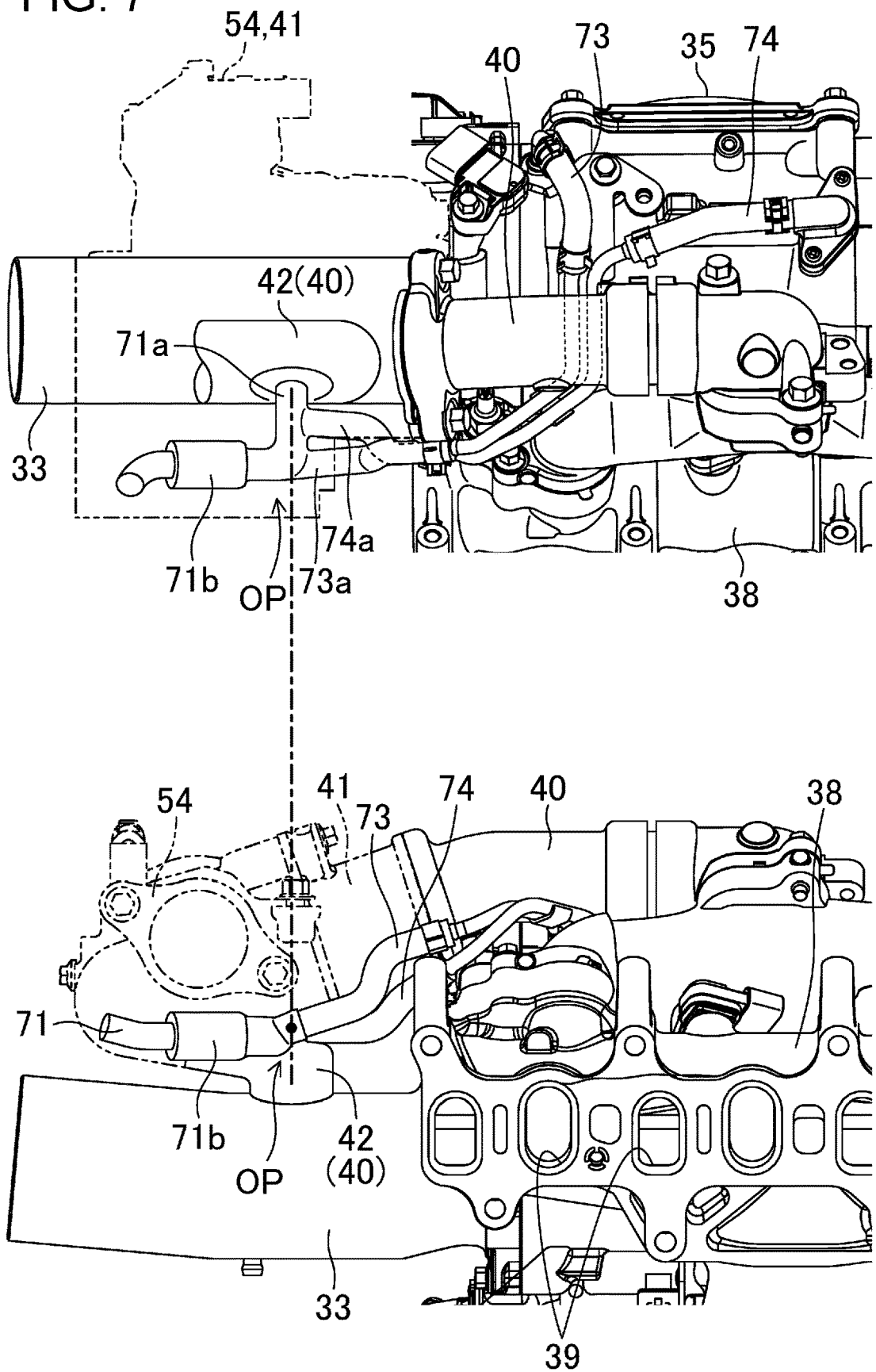
FIG. 7 illustrates main components of a blow-by gas passage, wherein a top view of the main components is shown on the upper side and a rear view of the main components is shown on the lower side.

FIG. 6 schematically illustrates main components of the blow-by gas passage 71. FIG. 7 illustrates in detail the main components of the blow-by gas passage 71. As illustrated in these figures, a downstream portion of the blow-by gas passage 71 is comprised of a downstream-side introduction passage 71a, an upstream-side introduction passage 71b, a first branch passage 73a, a second branch passage 74a, and the like.

The downstream-side introduction passage 71a is connected to a portion 42 of the vicinity of the upstream-side branch part 33a in the bypass passage 40. The blow-by gas is introduced into the intake passage 30 through a blow-by gas introduction port 75 opening at the connection part of the downstream-side introduction passage 71a.

Furthermore, the first branch passage 73a and the second branch passage 74a branch off from a portion upstream of the blow-by gas introduction port 75 in the downstream-side introduction passage 71a. The first branch passage 73a is located upstream of the second branch passage 74a. The first branch passage 73a communicates with the first communication passage 73. The second branch passage 74a communicates with the second communication passage 74.

The upstream-side introduction passage 71b is connected to the downstream-side introduction passage 71a while extending transversely to an upstream portion of the downstream-side introduction passage 71a. Specifically, the upstream-side introduction passage 71b extends in the cylinder row direction. The downstream-side introduction passage 71a branches off from a downstream portion of the upstream-side introduction passage 71b and curves to extend in a direction substantially perpendicular to the cylinder row direction. Furthermore, the first branch passage 73a extends in the cylinder row direction from a bent part between the upstream-side introduction passage 71b and the downstream-side introduction passage 71a so as to be connected straight to the upstream-side introduction passage 71b.

On the other hand, the second branch passage 74a extends from an intermediate portion of the downstream-side introduction passage 71a in the cylinder row direction in parallel to the first branch passage 73a. The upstream-side introduction passage 71b is comprised of a tube having a larger diameter than the first branch passage 73a and the second branch passage 74a.

The upstream-side introduction passage 71b, the downstream-side introduction passage 71a, and the first branch passage 73a, which are configured as described above, constitute an oil separation supply part OP. The oil separation supply part OP separates oil from the blow-by gas, and supplies the oil, in particular, to the first communication passage 73. Furthermore, the upstream-side introduction passage 71b constitutes a straight part and the downstream-side introduction passage 71a constitutes a cross part.

As illustrated in FIGS. 2 and 4, the first communication passage 73 and the second communication passage 74 pass between the supercharger 34 and the bypass passage 40 disposed above the supercharger 34. The oil separation supply part OP is disposed in a small gap between the first passage 33 and the bypass passage 40. Furthermore, the oil separation supply part OP is configured to be compact while being part of the blow-by gas passage 71.

Thus, the blow-by gas passage 71 and each of the communication passages 73 and 74 are in an organic and compact layout. Furthermore, the communication passages 73 and 74 are arranged in the cylinder row direction. This arrangement allows intake air to smoothly flow, and contributes to a compact layout.

As illustrated in FIGS. 5 and 6, each intake-side annular space 34f is provided near an associated one of the shaft holes 345a facing bearing chambers 345 of the casing 34b. The intake-side annular space 34f is an annular space formed around each of the rotation shafts 81 and 82. As illustrated in FIG. 6 on an enlarged scale, each intake-side annular space 34f is provided with an annular stepped part 34f1 having a diameter larger than the shaft hole 345a.

The intake-side sealing member 91 is adjacent to the intake-side annular space 34f via the annular stepped part 34f1 while facing the intake-side annular space 34f. The annular stepped portion 34f1 increases the volume of the intake-side annular space 34f. Note that the annular stepped part 34f1 can be formed by cutting a portion, of the casing 34b, located inside the sealing member 91 using, for example, an end mill.

As illustrated in the cross-sectional view on the right side of FIG. 5, the two intake-side annular spaces 34f, 34f are connected to each other through a single first connection passage 34g that is a vertical hole. Thus, the two intake-side annular spaces 34f, 34f can be easily caused to communicate with each other by drilling.

On the other hand, the discharge-side annular space 34h is provided near each of the shaft holes 344a facing the gear chamber 344 of the casing 34b. The discharge-side annular space 34h is an annular space formed around each of the rotation shafts 81 and 82. Around each shaft hole 344a facing the gear chamber 344, two sealing members (an outer sealing member 92 and an inner sealing member 93) are disposed to face each other with a gap interposed therebetween. The outer sealing member 92 is disposed adjacent to the gear chamber 344 and the inner sealing member 93 is disposed adjacent to the rotor chamber 343.

Between the outer sealing member 92 and the inner sealing member 93, the discharge-side annular space 34h is provided. Each of the outer sealing member 92 and the inner sealing member 93 is adjacent to the discharge-side annular space 34h while facing the discharge-side annular space 34h. Reference is now made to the cross-sectional view taken along line Va-Va, shown on the left side of FIG. 5. The two discharge-side annular spaces 34h, 34h are also connected to each other through a second connection passage 34i that is a vertical hole, similarly to the intake-side annular spaces 34f.

The first communication passage 73 is connected to each intake-side annular space 34f via the first connection passage 34g. The second communication passage 74 is connected to each discharge-side annular space 34h via the second connection passage 34i.

As described above, the first communication passage 73 and the second communication passage 74 branch off from the blow-by gas passage 71 through the oil separation supply part OP. The first communication passage 73 communicates with the intake-side annular spaces 34f provided in the vicinity of the bearing parts 83 on the intake side of the supercharger 34, while the second communication passage 74 communicates with the discharge-side annular spaces 34h provided in the vicinity of the bearing parts 84 on the discharge side of the supercharger 34. This configuration makes it possible to suck intake air in the vicinity of the bearing parts 83 and 84 and the sealing members 91, 92, 93 or to supply oil to the vicinity of the bearing parts 83 and 84 and the sealing members 91, 92, 93 in accordance with the operation state of the engine 1. Examples of these operations will be described with reference to a state where supercharging is permed and a state where supercharging is not performed.

(State where Supercharging is Performed)

Figure 8A:
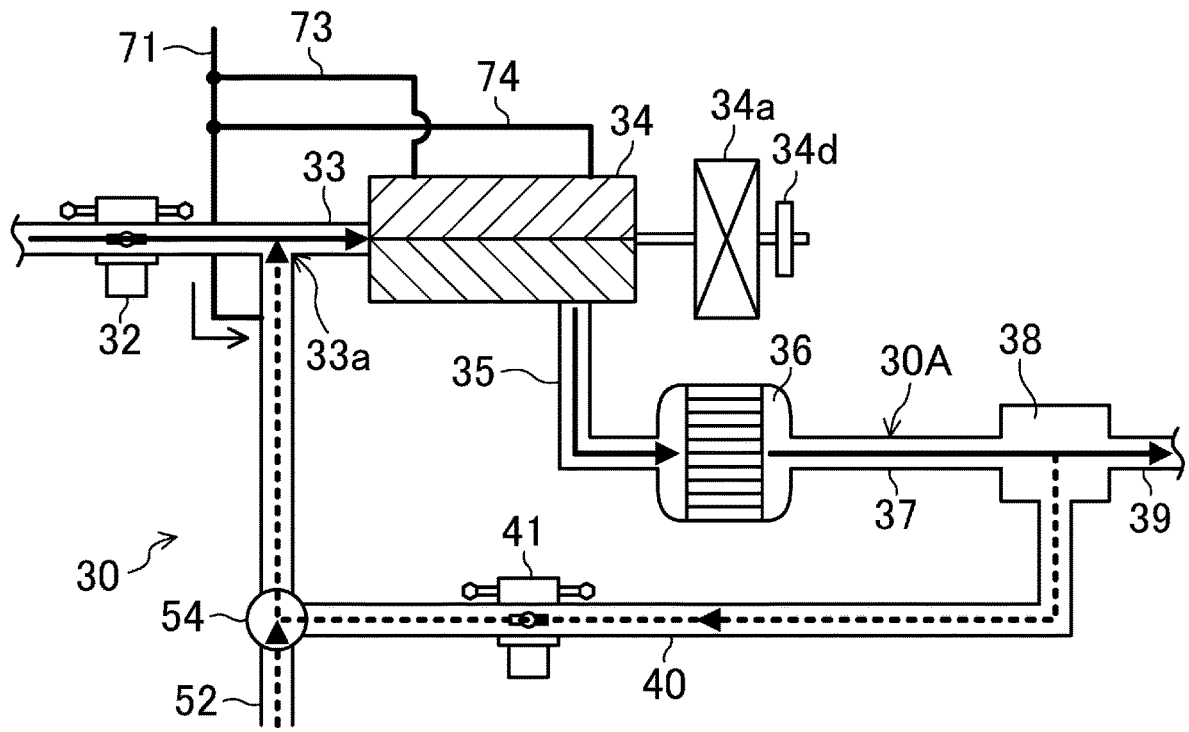
FIG. 8A schematically illustrates a flow of intake air when supercharging is performed.

FIG. 8A illustrates a flow of intake air in the intake passage 30 in a state when supercharging is performed. For example, when an accelerator pedal is depressed and acceleration is requested, the ECU 7 actuates the supercharger 34 by causing the electromagnetic clutch 34a to connect the supercharger 34 to the crankshaft 15, and adjusts the opening degree of the bypass valve 41 while the vehicle is traveling.

In such a case, the throttle valve 32 is normally adjusted to be substantially fully opened and air is introduced into the intake passage 30 without being throttled. Furthermore, the opening degree of the EGR valve 54 is appropriately adjusted in accordance with the operation state of the engine 1. Consequently, external EGR gas is introduced into the intake passage 30. Moreover, the opening degree of the PCV valve 72 is appropriately adjusted, so that blow-by gas is also introduced into the intake passage 30.

Consequently, the air, the external EGR gas, and the blow-by gas (also simply referred to as intake air) which are in a supercharged state are introduced into the combustion chambers 16 through the main intake passage 30A. At this time, due to the adjustment of the opening degree of the bypass valve 41, part of the intake air that has passed through the supercharger 34 flows back to a portion upstream of the supercharger 34 through the bypass passage 40. Depending on the amount of the intake air flowing backward, the supercharging pressure of the intake air to be introduced into the combustion chambers 16 is adjusted.

As can be seen, when the supercharger 34 is in operation, the discharge side of the inside of the rotor chamber 343 has a high pressure. Therefore, internal pressure of the discharge-side annular spaces 34h, which are located in the vicinity of the rotor chamber 343 and communicate with the rotor chamber 343 through the shaft holes 344a, also increases in accordance with the supercharging pressure. Normally, the internal pressure of the discharge-side annular spaces 34h is higher than that of the blow-by gas passage 71.

Accordingly, dust and condensed water adhering to the vicinity of the bearing parts 84 and the sealing members 92 and 93 can be sucked out to the blow-by gas passage 71 through the discharge-side annular spaces 34h and the second communication passage 74 together with the intake air. As a result, the deterioration of the bearing parts 84 and the sealing members 92 and 93 can be reduced.

On the other hand, when the supercharger 34 is in operation, the intake side of the inside of the rotor chamber 343 tends to have a low pressure. Therefore, an internal pressure of the intake-side annular spaces 34f, which are located in the vicinity of the rotor chamber 343 and communicate with the rotor chamber 343 through the shaft holes 345a is likely to decrease in accordance with the supercharging pressure. In such a case, the internal pressure of the intake-side annular spaces 34f becomes lower than that of the blow-by gas passage 71.

Consequently, the blow-by gas is introduced into the intake-side annular spaces 34f. The intake-side annular spaces 34f communicate with the bearing chambers 345, in which oil is insufficient and lubrication failure is likely to occur, unlike the gear chamber 344. Therefore, supply of the blow-by gas containing oil to the intake-side annular spaces 34f and the bearing chambers 345 makes it possible to improve the lubrication and sealability of the intake-side sealing member 91 and the lubrication of the bearing parts 83 on the intake side.

If the pressure of the intake side of inside of the rotor chamber 343 also increases similarly to the discharge side, dust and the like adhering to the vicinity of the bearing parts 83 and the sealing member 91 can be sucked out to the blow-by gas passage 71. In such a case, the deterioration of the bearing parts 83 and the sealing member 91 can be reduced.

(State where Supercharging is not Performed)

Figure 8B:
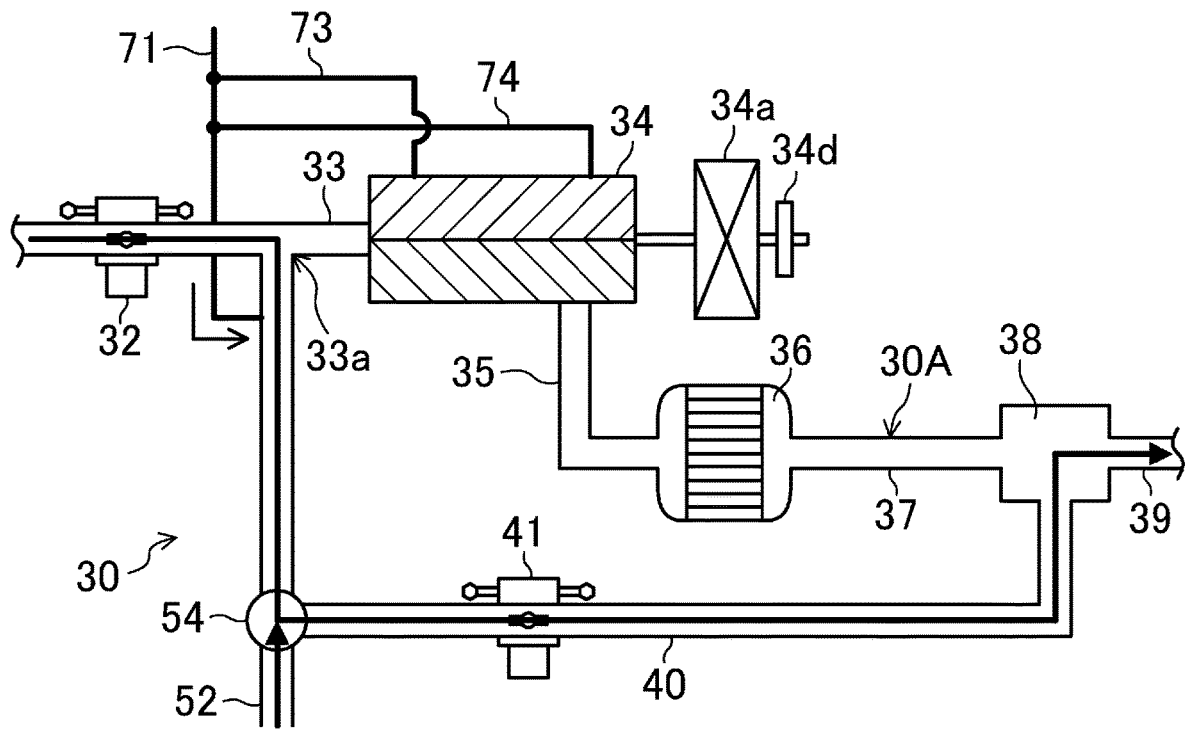
FIG. 8B schematically illustrates a flow of intake air at the time of supercharging is not performed.

FIG. 8B illustrates a flow of intake air in the intake passage 30 in a state where supercharging is not performed. For example, in the case of idling or inertia travel, the ECU 7 stops the operation of the supercharger 34 by disconnecting the electromagnetic clutch 34a, and fully opens the bypass valve 41.

In such a case, the opening degree of the throttle valve 32 is appropriately adjusted in accordance with the operation state of the engine 1, so that an appropriate amount of air is introduced into the intake passage 30. Furthermore, the opening degree of the EGR valve 54 is appropriately adjusted in accordance with the operation state of the engine 1, so that external EGR gas is introduced into the intake passage 30. Moreover, the opening degree of the PCV valve 72 is appropriately adjusted, so that blow-by gas is also is introduced into the intake passage 30.

Consequently, the intake air flowing through the intake passage 30 bypasses the supercharger 34, and then, is introduced into the combustion chambers 16 while being in a natural intake state. As can be seen, when the supercharger 34 is not operating, the inside of the rotor chamber 343 is in a non-pressurized state. Therefore, the internal pressure of the intake-side annular spaces 34f and the internal pressure of the discharge-side annular spaces 34h do not increase.

Therefore, a difference between the internal pressure of the blow-by gas passage 71 and the internal pressure of each of the intake-side annular spaces 34f and the discharge-side annular spaces 34h is relatively small. Thus, the flow of the blow-by gas can change in accordance with the operation state of the engine 1.

Specifically, a change in pressure balance caused by the pumping action of the combustion chambers 16 makes the internal pressure of each of the intake-side annular space 34f and the discharge-side annular space 34h higher than that of the blow-by gas passage 71, or makes the internal pressure of each of the intake-side annular space 34f and the discharge-side annular space 34h lower than that of the blow-by gas passage 71.

For example, various studies conducted by the present inventors have demonstrated that at the time of a low load operation, there is little difference between the internal pressure (negative pressure) of the intake-side annular space 34f and the discharge-side annular space 34h and the internal pressure (negative pressure) of the blow-by gas passage 71. The pressure balance becomes delicate.

Thus, there is a case where blow-by gas is introduced into the intake-side annular space 34f and the discharge-side annular space 34h depending on the operation state of the engine 1. In that case, as schematically illustrated in FIG. 6, the blow-by gas is introduced into the intake-side annular spaces 34f and the discharge-side annular spaces 34h via the first branch passage 73a and the second branch passage 74a.

Here, the first branch passage 73a is connected straight to the upstream-side introduction passage 71b (i.e., the straight part) extending linearly. Therefore, oil mist contained in the blow-by gas easily flows into the first communication passage 73 due to the inertia. The blow-by gas that is lighter than the oil mist easily flows into the downstream-side introduction passage 71a (i.e., the cross part). As a consequence, the blow-by gas containing a relatively large amount of oil is distributed to the first communication passage 73 and flows into the intake-side annular spaces 34f.

As described above, the intake-side annular spaces 34f communicate with the bearing chamber 345 in which oil is insufficient and lubrication failure is likely to occur. Thus, the lubrication and sealability of the intake-side sealing member 91 and the lubrication of the bearing parts 83 on the intake side can be improved.

Application Example

Figure 9:
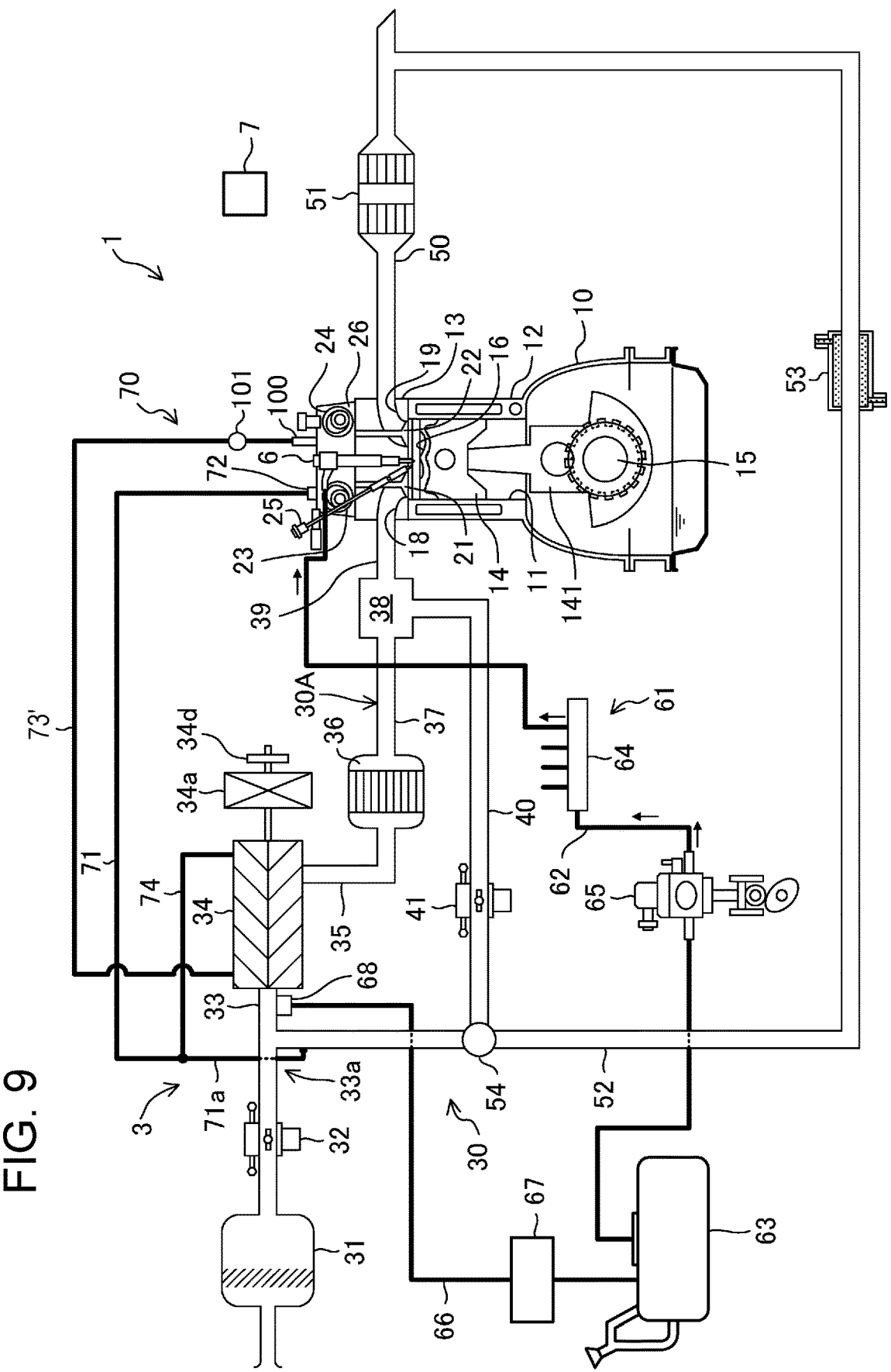
FIG. 9 illustrates a configuration of an engine of an application example.

FIG. 9 illustrates an application example of the present disclosure.

In the embodiment described above, both the first communication passage 73 connected to the intake-side annular spaces 34f and the second communication passage 74 connected to the discharge-side annular spaces 34h branch off from the portion downstream of the PCV valve 72 in the blow-by gas passage 71. On the other hand, in this application example, the first communication passage 73 communicating with the intake-side annular spaces 34f does not branch off from the portion downstream of the PCV valve 72, but independently communicates with a portion upstream of the PCV valve 72 in the blow-by gas return system 70.

As described above, when supercharging is not performed, the blow-by gas is introduced into or sucked from the intake-side annular spaces 34f and the discharge-side annular spaces 34h in accordance with the operation state of the engine 1. Furthermore, in terms of structure, it is preferable for the intake-side annular spaces 34f to improve the sealability and lubrication through the introduction of the blow-by gas rather than reducing the entry of dust and the like through the suction of the blow-by gas.

Accordingly, depending on the configuration of the engine 1, it may be favorable to be able to introduce the blow-by gas more stably into the intake-side annular spaces 34f. This application example is suitable for an engine 1 of such a type. The configuration of the application example makes it possible to stably introduce the blow-by gas into the intake-side annular spaces 34f without being influenced by the operation state of the engine 1.

Figure 10:
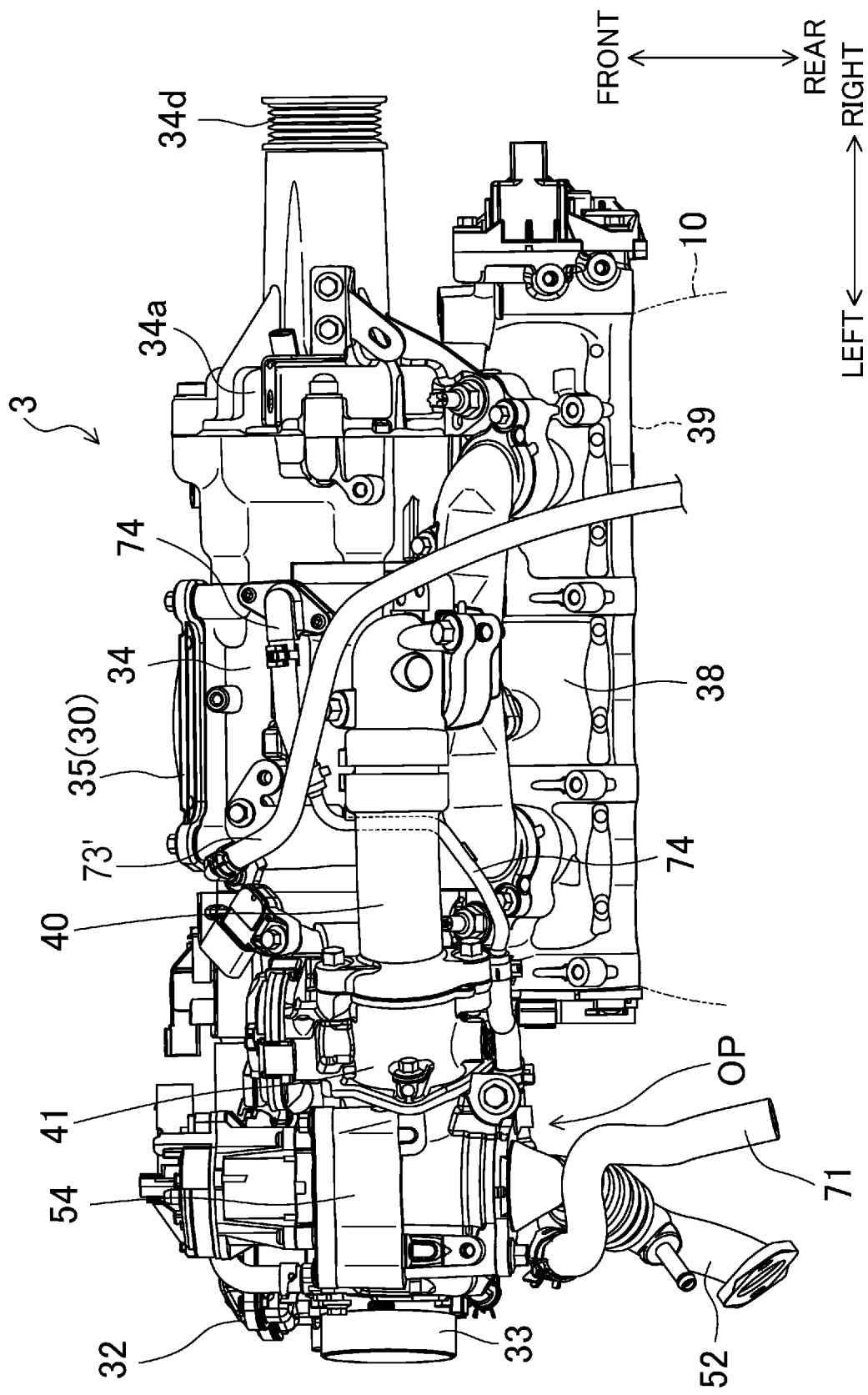
FIG. 10 is a top view of an intake unit of the application example.

As illustrated in FIG. 10, the first passage of the application example (referred to as an application first communication passage 73') is not connected to the first branch passage 73a. The application first communication passage 73' is installed to extend from a part on the intake side of the supercharger 34 toward the cylinder head cover 26 through the vicinity of the bypass passage 40.

Figure 11:
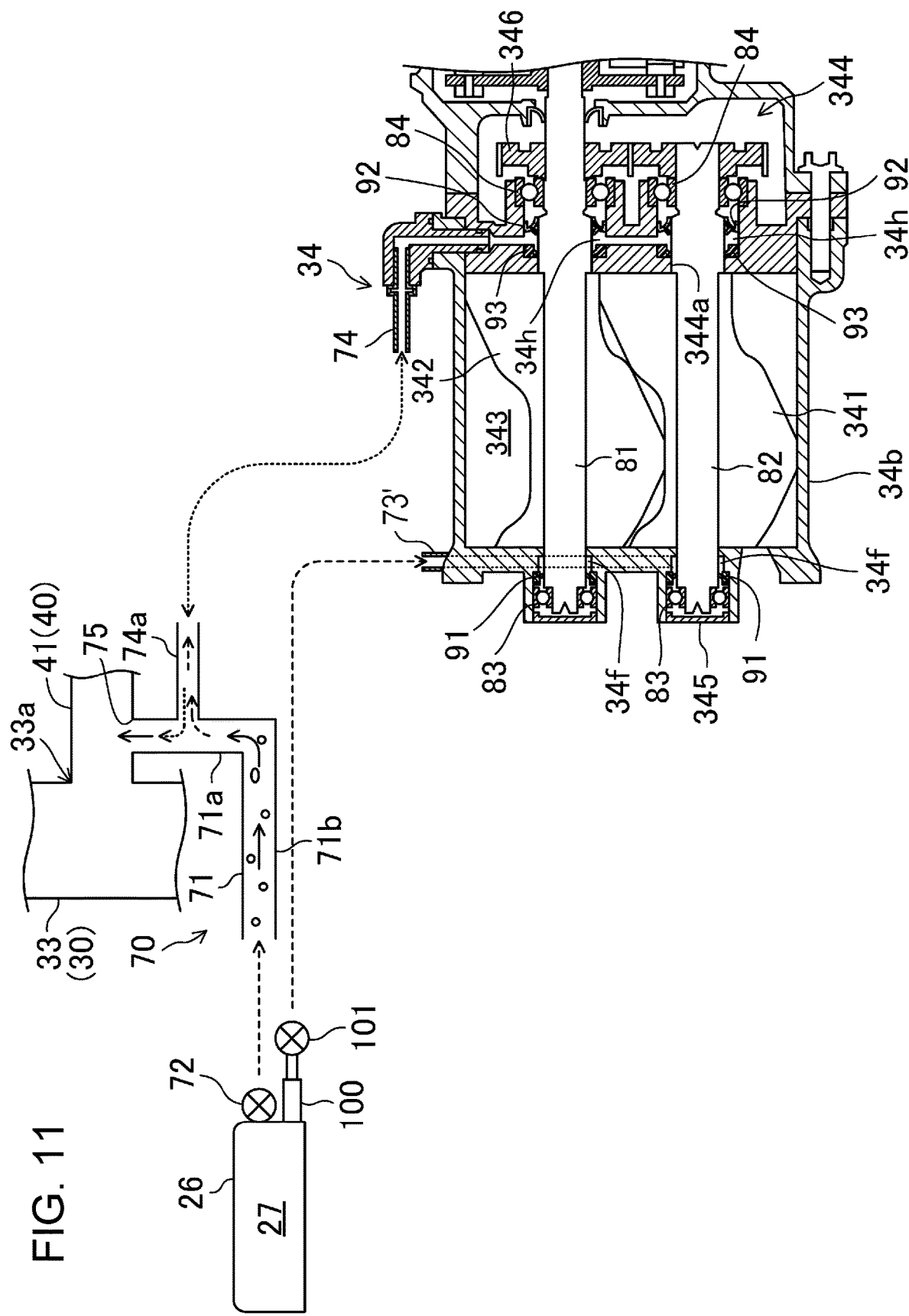
FIG. 11 schematically illustrates a connection configuration between a supercharger and a blow-by gas return system of the application example.

As a result, the first branch passage 73a is excluded, as illustrated in FIG. 11. In this application example, the second branch passage 74a and the second communication passage 74 are configured in the same manner as in the configuration example illustrated in FIG. 6. Alternatively, the second branch passage 74a may be excluded, instead of the first branch passage 73a, and the second communication passage 74 may be connected to the first branch passage 73a.

An upstream side of the application first communication passage 73' is directly connected to the cylinder head cover 26. As the result, the application first communication passage 73' communicates with the oil separator chamber 27.

The application first communication passage 73' is provided, at the upstream end thereof, with an orifice 100 that reduces a sectional area of a flow passage. The orifice 100 produces a predetermined pressure difference between an upstream side and a downstream side of the orifice 100. Consequently, the amount of blow-by gas flowing into the intake-side annular spaces 34f is reduced through the application first communication passage 73'. The orifice 100 is an example of a flow rate reducer. The flow rate reducer may be a throttle value capable of adjusting a flow rate.

When the amount of the blow-by gas flowing into the intake-side annular spaces 34f increases, the amount of intake air may fluctuate due to the blow-by gas entering the rotor chamber 343. Specifically, unlike the first communication passage 73 branching off from the blow-by gas passage 71, the application first communication passage 73' independently introduces the blow-by gas from the oil separator chamber 27 into the supercharger 34. Therefore, the amount of the blow-by gas to be introduced into the supercharger 34 tends to increase.

When the amount of intake air fluctuates, the output of the engine 1 may decrease. Reducing the amount of the blow-by gas flowing into the intake-side annular spaces 34f with the orifice 100 makes such a problem less likely to occur Furthermore, the application first communication passage 73' is provided, at the upstream end thereof, with a check valve 101 (an example of an anti-backflow part) in order to reduce backflow of the blow-by gas to the oil separator chamber 27. Reducing the backflow of the blow-by gas enables the blow-by gas to be introduced more stably into the intake-side annular spaces 34f without being influenced by the operation state of the engine 1. The check valve 101, which is capable of preventing the backflow of the blow-by gas, is an effective means.

As described above, the application example makes it possible to stably improve the lubrication of the sealing member 91 and the bearing parts 83 on the intake side, at which lubrication failure is likely to occur because of the structure. Furthermore, for the bearing parts 84 on the discharge side at which lubrication failure is relatively unlikely to occur, the application example makes it possible to improve the lubrication, and to reduce the entry of dust and the like by sucking dust and the like that have been entered the discharge side.

The present disclosure is not limited to the above-described embodiment and application example. The present disclosure also encompasses various other configurations.

For example, both the first communication passage 73 and the second communication passage 74 may communicate with a portion upstream of the PCV valve 72 in the blow-by gas passage 71, instead of branching off from the portion downstream of the PCV valve 72 in the blow-by gas passage 71. Furthermore, depending on the configuration of the engine, only one of the first communication passage 73 and the second communication passage 74 may be provided.

The upstream end of the application first communication passage 73' may communicate with a portion upstream of the PCV valve 72 in the blow-by gas passage 71.

The anti-backflow part is not essential. Furthermore, although the check valve 101 is preferable as the anti-backflow part, the anti-backflow part is not limited thereto. Any parts can be used as the ant-backflow part as long as they are capable of preventing the backflow of blow-by gas.

What is claimed is:

1. A blow-by gas device of a supercharger-equipped engine, the blow-by gas device comprising:
   a supercharger disposed in a portion downstream of a throttle valve in an intake passage;
   a positive crankcase ventilation (PCV) valve; and
   a blow-by gas passage connected to a portion of the intake passage located between the throttle valve and the supercharger and to an engine body, the blow-by gas passage introducing blow-by gas discharged from the engine body into the intake passage via the PCV valve, wherein
   the supercharger includes:
     a supercharger body including therein a rotor chamber,
     a rotation shaft rotatably supported on a bearing part communicating with the rotor chamber, the rotation shaft being rotatable by power of a driving source, and
     a supercharger rotor provided integrally with the rotation shaft and rotatably disposed inside the rotor chamber, the supercharger body includes a space communicating with the bearing part, the space is connected to a communication passage branching off from a portion downstream of the PCV valve in the blow-by gas passage, the supercharger body includes a sealing member disposed between the bearing part and the rotor chamber, the space is an annular space adjacent to the sealing member and formed around the rotation shaft, the bearing part is located on a discharge side of the supercharger, and the space is defined between the sealing member and a second sealing member facing the sealing member.

2. A blow-by gas device of a supercharger-equipped engine, the blow-by gas device comprising:

a supercharger disposed at a portion downstream of a throttle valve in an intake passage;

a positive crankcase ventilation (PCV) valve; and a blow-by gas passage connected to a portion of the intake passage located between the throttle valve and the supercharger and to an engine body, the blow-by gas passage introducing blow-by gas discharged from the engine body into the intake passage via the PCV valve, wherein the supercharger includes:
  a supercharger body including therein a rotor chamber,
  a pair of bearing parts that are installed respectively on an intake side and a discharge side of the supercharger,
  a rotation shaft rotatably supported on the pair of bearing parts, the rotation shaft being rotatable by power of a driving source, and
  a supercharger rotor provided integrally with the rotation shaft and rotatably disposed inside the rotor chamber, the supercharger body includes:
  an intake-side space communicating with the bearing part on the intake side, and
  a discharge-side space communicating with the bearing part on the discharge side, the intake-side space is connected to a first communication passage communicating with a portion upstream of the PCV valve in the blow-by gas passage or with the engine body, and the discharge-side space is connected to a second communication passage branching off from a portion downstream of the PCV valve in the blow-by gas passage.

3. The blow-by gas device of claim 2, wherein the supercharger body includes:
  an intake-side sealing member disposed between the bearing part on the intake side and the rotor chamber, and
  a discharge-side sealing member disposed between the bearing part on the discharge side and the rotor chamber, the intake-side space is an annular space adjacent to the intake-side sealing member and formed around the rotation shaft, and the discharge-side space is an annular space adjacent to the discharge-side sealing member and formed around the rotation shaft.

4. The blow-by gas device of claim 3, wherein the intake-side space is defined by the intake-side sealing member and an annular stepped portion provided at the supercharger body.

5. The blow-by gas device of claim 3, wherein the discharge-side space is defined between the discharge-side sealing member and a second sealing member facing the discharge-side sealing member.

6. The blow-by gas device of claim 4, wherein the discharge-side space is defined between the discharge-side sealing member and a second sealing member facing the discharge-side sealing member.

7. The blow-by gas device of claim 2, wherein the blow-by gas is discharged through an oil separator chamber provided in the engine body, and the first communication passage includes a flow rate reducer that communicates with the oil separator chamber and reduces an amount of the blow-by gas flowing into the intake-side space.

8. The blow-by gas device of claim 7, wherein the first communication passage further includes an anti-backflow part that reduces backflow of the blow-by gas to the oil separator chamber.

* * * * *